UNITED STATES PATENT OFFICE 2,160,755

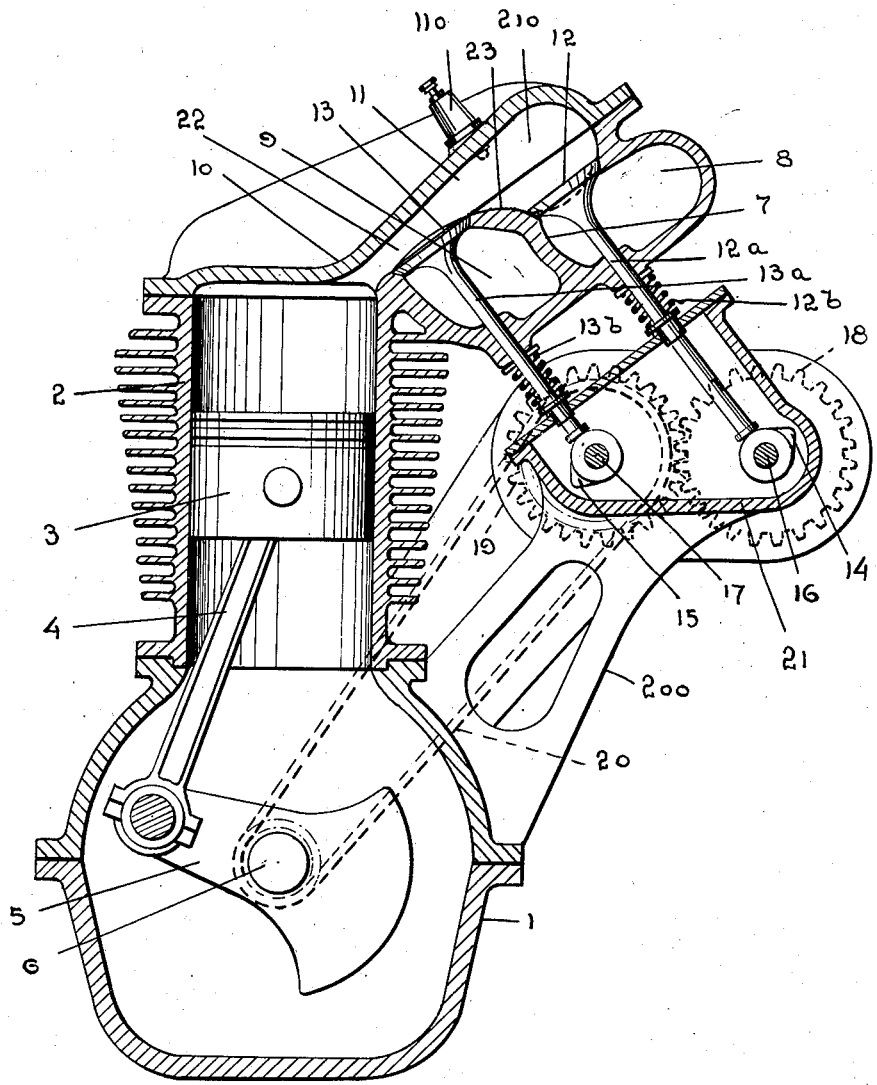

INTERNAL COMBUSTION ENGINE

Gideon Efraim Sandblom, Farjenas, near Gothenburg, Sweden

Application May 18, 1938, Serial No. 208,699
In Sweden September 19, 1935

1 Claim. (Cl. 123—191)

The present invention relates to internal combustion engines having a reciprocating piston and an admission and an exhaust valve arranged at the top of the working cylinder.

One object of the invention is to provide a combustion engine of the kind referred to in which the compression ratio may be chosen very high without any risk of advanced self-ignition.

A further object of the invention is to provide a combustion engine in which the fuel and air will be mixed very intimately.

Some embodiments of the invention are shown in the drawing, wherein:

The figure is an axial section through an air-cooled single-cylinder combustion engine according to the one embodiment.

Referring to the figure reference numeral 1 designates the crank case, 2 the working cylinder connected to said crank case and 3 the piston which is by means of the rod 4 connected to the crank 5 of the crank shaft 6. From the upper end of the cylinder there projects laterally a valve chamber 7, with a channel 8 for the supply of fuel-air mixture and a channel 9 for the discharge of the combustion gases. The upper end of the cylinder is closed by a cover 10 which together with the valve chamber forms a combustion chamber 11 communicating with the upper end of the cylinder. The combustion chamber 11 communicates through an opening controlled by a mushroom valve 12 with the channel 8 for the fuel-air mixture and through another opening controlled by a mushroom valve 13 with the discharge channel 9. The spindles 12a and 13a of these valves are parallel to each other and are operated by the cams 14, 15 of two parallel cam shafts 16, 17 journalled in a casing 21, which is supported by a bracket 200 projecting from the crank case 1. Each cam shaft carries a toothed wheel 18 and 19 respectively which toothed wheels mesh with each other and are driven from the crank shaft 6 by means of a chain 20. As the crank shaft 6 rotates the cam shafts 16, 17 will by means of the cams 14, 15 in a usual manner timely open the valves 12, 13 which are brought back to closed position by the valve springs 12b, 13b.

The seat of the admission valve 12 which is located at the inner end of the combustion chamber 11, is in relation to the seat of the exhaust valve 13 drawn back in the direction of valve shaft 12a, so as to form an enlarged portion 210 at the inner end of the combustion chamber 11 to which enlarged portion 210 the outer, more narrow portion 22 of the combustion chamber is mainly tangential. The inner enlarged portion 210 of the combustion chamber 11 may be of cylindrical, spherical or similar shape. The surface of the admission valve 12 facing towards the interior of the combustion chamber may suitably be concave. The discharge valve 13 is located at the outer, narrow portion 22 of the combustion chamber 11 and the surface of the discharge valve facing towards the combustion chamber is slightly convex and forms, when said valve is in closed position, together with that portion 23 of the combustion chamber wall which is situated between the valves 12, 13 an evenly curved surface. For the ignition of the fuel-air mixture there is provided a sparking plug 110.

During the suction stroke of the piston the fuel-air mixture entering the combustion chamber through the admission valve 12 will with very little resistance flow into the cylinder and thereby sweep over the discharge valve 13 which thus will be thoroughly cooled. During the compression stroke of the piston the fuel-air mixture is forced back into the combustion chamber 11 and will sweep over its walls which will be cooled at the same time as the fuel and the air due to the occurring turbulence of the fuel-air mixture will be intimately mixed.

The scope of the invention is not limited to the embodiment shown and described but may be varied in details without departing from the spirit thereof.

What I claim is:

In an internal combustion engine having a working cylinder and a reciprocating piston, a combustion chamber communicating at its one end with the upper end of said working cylinder, a mushroom valve for the supply of fuel-air mixture arranged at the inner portion of said combustion chamber and provided with a valve spindle, the seat for said valve being drawn back in the direction of said valve spindle so as to form at the inner end of said chamber an enlarged portion of said chamber, a discharge valve for the combustion gases arranged between said admission valve and said working cylinder, that portion of the walls of said chamber, which is located between the seats of said valves forming together with the outer surface of said discharge valve an evenly curved surface.

GIDEON EFRAIM SANDBLOM.